(12) United States Patent
Yoon et al.

(10) Patent No.: US 7,935,272 B2
(45) Date of Patent: May 3, 2011

(54) DISPERSANT HAVING MULTIFUNCTIONAL HEAD AND PHOSPHOR PASTE COMPOSITION COMPRISING THE SAME

(75) Inventors: Seon Mi Yoon, Yongin-si (KR); Hyeon Jin Shin, Suwon-si (KR); Jae Young Choi, Suwon-si (KR); Seong Jae Choi, Seoul (KR); Bum Jae Lee, Daejeon (KR); Ungyu Paik, Seoul (KR); Sangkyu Lee, Seoul (KR); Jung Hwan Lee, Gyeongsangbuk-do (KR)

(73) Assignee: Samsung Electronics Co., Ltd. (KR)

( * ) Notice: Subject to any disclaimer, the term of this patent is extended or adjusted under 35 U.S.C. 154(b) by 197 days.

(21) Appl. No.: 11/852,734

(22) Filed: Sep. 10, 2007

(65) Prior Publication Data

US 2008/0230748 A1 Sep. 25, 2008

(30) Foreign Application Priority Data

Mar. 21, 2007 (KR) .................. 10-2007-0027591

(51) Int. Cl.
*C09K 11/02* (2006.01)
(52) U.S. Cl. .............. 252/301.36; 252/301.35; 523/161; 524/556; 524/555; 524/601; 524/560
(58) Field of Classification Search ............. 252/301.36; 523/161; 524/556, 555, 601, 560
See application file for complete search history.

(56) References Cited

U.S. PATENT DOCUMENTS

| | | | | |
|---|---|---|---|---|
| 5,952,036 | A * | 9/1999 | Tadaki et al. | 427/64 |
| 7,004,812 | B2 * | 2/2006 | Uegaki et al. | 445/51 |
| 7,053,551 | B2 * | 5/2006 | Hoshino et al. | 313/581 |

* cited by examiner

*Primary Examiner* — C. Melissa Koslow
(74) *Attorney, Agent, or Firm* — Cantor Colburn LLP (57) ABSTRACT

Disclosed is a dispersant having a multifunctional head, and a phosphor paste composition comprising the dispersant. The dispersant has a multifunctional head that comprises an acidic group, a basic group and an aromatic group, thereby enhancing an affinity for the surface of phosphor particles and improving dispersibility.

8 Claims, 3 Drawing Sheets

DISPERSANT HAVING MULTIFUNCTIONAL HEAD AND PHOSPHOR PASTE COMPOSITION COMPRISING THE SAME

BACKGROUND OF THE INVENTION

This non-provisional application claims priority under 35 U.S.C. §119(a) to Korean Patent Application No. 10-2007-0027591 filed on Mar. 21, 2007, the entire contents of which are hereby incorporated by reference.

FIELD OF THE INVENTION

The present invention relates to a dispersant having a multifunctional head and a phosphor paste composition comprising the dispersant. More specifically, the present invention relates to a dispersant having a multifunctional head that comprises an acidic group, a basic group and an aromatic group, thereby enhancing an affinity for the surfaces of a variety of phosphor particles and thus improving dispersibility.

DESCRIPTION OF THE RELATED ART

In recent years, a variety of display devices have been developed and widely used as substitutes for cathode ray tubes (CRTs). Such display devices include flat panel displays (FPDs), such as, for example, liquid crystal displays (LCDs), plasma display panels (PDPs), electro-luminescent displays (ELDs), field emission displays (FEDs), and vacuum fluorescent displays (VFDs). Such display devices can be used for exterior decorations or display parts of electronic appliances, e.g., exterior decorations or keypads of cellular phones.

It is desirable for such display devices to include a fluorescent screen. The luminescent properties of the display devices can be varied depending upon the physical properties. In other words, although a phosphor inherently has a high luminance, unless a fluorescent film made of the phosphor is suitably formed, the display device including the fluorescent film cannot exhibit high luminance.

A fluorescent film is generally produced by homogeneously applying a phosphor paste composition to a supporting substrate, followed by drying the phosphor paste composition. In general, phosphor paste compositions comprise a solvent, a binder and a phosphor and selectively comprise a dispersant for improving dispersibility of the phosphor.

The dispersant improves dispersibility of the phosphor, which leads to a lower viscosity. Thus by improving dispersibility, it is possible to increase the amount of the phosphor present in a given fluorescent film and to thereby increase the packing density of the phosphor in a fluorescent film. Thus the efficiency of fluorescence can be increased over a comparative film having an equivalent thickness, but having a lower packing density. Using a dispersant also permits an increase in the stability of a paste that can be used in a printing process.

Dispersants that are surfactants include a head and a tail. The head must have an affinity for a dispersoid to be dispersed in the dispersion media. The tail must have an affinity for a dispersion media capable of dispersing the dispersoid. In addition, it is desirable to use a dispersant capable of keeping adjacent phosphor particles apart from each other. In other words, it is desirable for the dispersant to prevent the phosphor particles from agglomerating with one another.

Commercially available dispersants for a phosphor have a monofunctional head generally comprise either an acidic group, or a basic or aromatic groups, and thus can disperse only specific phosphors having an affinity for selected functional group that are attracted to either the acidic group or the basic or the aromatic groups.

Accordingly, to improve the luminescent properties of display devices, there is an increasing demand to develop a novel dispersant for a phosphor that is capable of being applied to a variety of phosphors, e.g., organic phosphors, and exhibits superior dispersibility.

SUMMARY OF THE INVENTION

In one embodiment, it is desirable for a dispersant for a phosphor having a multifunctional head to have an enhanced affinity for the surface of the phosphor particles and thus improve dispersability. The multifunctional head comprises an acidic group, a basic group and an aromatic group.

The dispersant is capable of dispersing a variety of phosphors, is homogenous and exhibits superior dispersive capabilities For phosphors over other commercially available phosphors that do not have the multifunctional head.

A high luminance fluorescent film made using the dispersant can also be easily processed.

In another embodiment, a display device can be manufactured, wherein the display device comprises the fluorescent film that comprises the dispersant.

In another embodiment, there is provided a phosphor paste composition comprising the dispersant, a phosphor, and a binder solution comprising a solvent and an organic binder.

In yet another embodiment, the phosphor paste composition comprises a binder solution comprising a solvent and an organic binder, and a phosphor.

The phosphor paste composition may comprise about 30 to about 70% by weight of the phosphor, about 0.1 to about 10% by weight of the dispersant with respect to the phosphor powder, and the balance of the binder solution.

The phosphor paste may be used in the manufacture of fluorescent films that may be used in display devices, such as cathodoluminescent displays, liquid crystal displays, electroluminescence displays, and the like.

BRIEF DESCRIPTION OF THE DRAWINGS

The aforementioned features and other advantages will be more clearly understood from the following detailed description taken in conjunction with the accompanying drawings, in which.

DETAILED DESCRIPTION OF THE PREFERRED EMBODIMENTS

The aforementioned embodiments will now be described in greater detail with reference to the accompanying drawings.

As noted above, the dispersant comprises a multi head structure comprises an acidic group, a basic group and an aromatic group.

In one embodiment, the dispersant is represented by Formula 1 or 2:

wherein A is an aromatic group, B is an acidic group and C is a basic group; a, b and c are independently an integer from 0 to about 10 with the proviso that two or more of a, b and c are not simultaneously zero; n is an integer of 1 to about 15; and D is hydrogen, alkyl, polyester or polyether; and wherein A is an aromatic group, B is an acidic group and C is a basic group; a, b and c are independently an integer of 0 to about 10 with the proviso that two or more of a, b and c are not simultaneously zero; and n is an integer of 1 to about 15; and D is hydrogen, alkyl, polyester or polyether.

In the dispersant of Formula 1 or 2, A is benzene, or a heterocyclic compound substituted with nitrogen (N), sulfur (S) or oxygen (O); B is selected from carboxyl (—COOH) and phosphoryl (POOH) groups; and C is selected from aliphatic amine (—$NR_2$) wherein R is H, $CH_3$, $CH_2CH_3$, $(CH_2)_2CH_3$, or $(CH_2)_3CH_3$, and aromatic amine (—$XNR_2$) wherein X is benzene, and R is H, $CH_3$, $CH_2CH_3$, $(CH_2)_2CH_3$, or $(CH_2)_3CH_3$.

As can be seen from Formulas 1 and 2, the dispersant comprises an acidic, basic and aromatic functional groups whose ratios can be regulated to a desired level, thereby improving the affinity between one of the groups and the surface of phosphor particles. In other words, a specific functional group included in the head of the dispersant can have an affinity for the surface of phosphor particles that have chemical properties similar to the specific functional group. Generally, the surface of the phosphor particles does not have a single property, but a plurality of properties one of which may be compatible with one of the properties of one of the functional groups disposed upon the head of the dispersant.

Since the dispersant described above has a head comprising multiple functional group, the probability of it adhering to the surface of phosphor particles is improved. More specifically, a larger fraction of the dispersant can adhere to the surface of phosphor particles. In addition, the adhesive forces between the dispersant and the phosphor is improved. As a result, there can be improved dispersibility for a phosphor powder within a phosphor paste composition when the dispersant is used in the composition.

In the case where a dispersant is used for a phosphor powder having large differences in acidity of various phosphor particles, it is desirable to use a dispersant that comprises a block copolymer.

The dispersant can be applied to a variety of phosphors, e.g., organic and inorganic phosphors, by controlling the ratio of the functional groups.

The dispersant according to one embodiment preferably has a molecular weight of about 1,000 to about 20,000.

The dispersant can be prepared by copolymerizing at least two monomers in the presence of a catalyst. The monomer is selected from benzyl methacrylate, trimethylsilyl methacrylate, (diethylamino)ethyl methacrylate, glycidyl methacrylate, or the like, or a combination comprising at least one of the foregoing monomers. During the copolymerization, the structure (e.g., random or block) of the dispersant may be varied depending on the amount and addition type of each functional group.

More specifically, examples of preferred dispersants that can be represented by Formula 1 include a compound represented by Formula 3 below:

wherein a, b and c are independently an integer from 0 to about 10 with the proviso that two or more of a, b and c are not simultaneously zero; and n is an integer of about 1 to about 15.

Examples of preferred dispersants that can be represented by Formula 2 include a compound represented by Formula 4 below:

wherein a, b and c are independently an integer from 0 to about 10 with the proviso that two or more of a, b and c are not simultaneously zero; and n is an integer of about 1 to about 15.

In yet another embodiment, a phosphor paste composition comprises a binder solution and a phosphor, in addition to the dispersant.

The binder solution comprises an organic binder and a solvent. The organic binder is used to modify the viscosity of the phosphor paste composition. The organic binder is generally dissolved in the solvent, and prevents damage to the fluorescent film by changing the energy of attraction between the phosphors and the substrate, or between adjacent phosphor particles after the phosphor paste composition is dried. Examples of organic binder resins that can be used are acrylic polymers, styrenic polymers, cellulosic polymers, methacrylate ester polymers, styrene-acrylate ester copolymers, polyvinylbutyrals, polyvinyl alcohols, polyalkylene oxides, polypropylene carbonates, polymethylmethacrylates, polyesters, or the like, or a combination comprising at least one of the foregoing polymers. The organic binder is determined depending on the kind of an electronic application and the type of coating process.

Taking into consideration the kinds of the phosphor and the organic binder and the desired physical properties of the phosphor paste composition, the solvent used to prepare the binder solution can be selected from commercially available solvents and mixtures thereof. There is no particular restriction as to the kind of solvents that can be used in the phosphor paste composition, but it is desirable to use solvents that are volatilized at 150° C. or higher.

Examples of solvents that can be used are aromatic hydrocarbon compounds, e.g., toluene and xylene; ether compounds, e.g., tetrahydrofuran and 1,2-butoxyethane; ketone compounds, e.g., acetone, methyl ethyl ketone and cyclohexanone; ester compounds, e.g., ethyl acetate, butyl acetate and butyl carbitol acetate (BCA); and alcohol compounds, e.g., isopropyl alcohol, diethylene glycol monobutyl ether, terpineol, 2-phenoxyethanol, or the like, or a combination comprising at least one of the foregoing solvents.

The binder solution includes about 1.5 to about 30% by weight of the organic binder and the remainder of a mixed solvent. When the organic binder is used in an amount less than 1.5% by weight, there may disadvantageously occur deterioration in the quality (e.g., binding force) of a fluorescent film, after the phosphor paste composition is dried. Meanwhile, when the organic binder is used in an amount exceeding 30% by weight, there may disadvantageously occur a reduction in the amount of the phosphor used.

The phosphor used in the phosphor paste composition of is not specially restricted so long as it is used to prepare conventional phosphor paste compositions. Particularly, there is no restriction as to the kind and composition of the phosphor used. Since the phosphor paste composition is mainly used to form fluorescent films for display devices, such as cathodoluminescent displays, liquid crystal displays and electroluminescence displays, as well as for exterior decoration and display parts of electronic appliances, e.g., keypads of cellular phones, the kind and composition of the phosphor may be suitably selected according to the kind of excitation sources used to form the display devices and to excite the fluorescent films formed from the phosphor paste composition.

Specifically, commercially available red, green and blue phosphors in the form of oxide solid solutions may be used. Sulfide and organic phosphors may be used as the suitable phosphors. The type of phosphors depends upon the kind of excitation sources used in the display devices.

The phosphor paste composition may further comprise at least one additive selected from plasticizers, leveling agents, lubricants, antifoamers and the like, so long as the physical properties of the composition do not deteriorate.

The phosphor paste composition may comprise about 30 to about 70% by weight of the phosphor, the phosphor being in the form of a powder; with about 0.1 to about 10% by weight of the dispersant; the weight of the dispersant being based upon the weight of the phosphor powder, with the balance being the binder solution.

When the dispersant is used in amounts of less than 0.1% by weight, the amount of the phosphor used is has to be increased in order to produce the same amount of luminance. The result is that the viscosity of the phosphor paste composition is increased and processing becomes difficult. Meanwhile, when the content of the dispersant exceeds 10% by weight, the contents of the other components has to be reduced in order to generate the same amount of luminance and there is a risk that the physical properties of the phosphor paste composition may be deteriorated.

By using the dispersant the content of the phosphor can be increased to about 40 to about 70% by weight, based upon the weight of the paste composition. Further, the increased content of the phosphor in the phosphor paste composition contributes to an improvement in the luminance of a fluorescent film formed from the paste composition.

The phosphor paste composition can be prepared by adding the dispersant to the binder solution and adding the phosphor powder thereto. Specifically, the phosphor paste composition can be prepared in accordance with the following procedure. First, an organic binder, such as polyester, is dissolved in cyclohexanone as a solvent. Then, to the solution are added a vehicle (the vehicle being another solution in which the binder is melted), followed by the addition of a phosphor. The resulting mixture is homogeneously dispersed using a mill, such as a 3-roll mill, to prepare the final phosphor paste composition.

In one embodiment, a fluorescent film can be produced from the phosphor paste composition. The fluorescent film is produced by applying the phosphor paste composition to a support, such as glass or transparent plastic, to form a particular pattern thereon and firing the coated support by drying and baking.

The fluorescent film can be produced by known techniques, including but not limited to pattern screen printing, gravure roll coating, ink jet, and the like.

The fluorescent film produced from the phosphor paste composition enables an increase in the packing density of the phosphor, an improvement in the luminance, and a relatively limited increase in the viscosity of the composition despite the increased loading amount of phosphors, thus leading to an improvement in the processability of the fluorescent film.

The fluorescent film of the present invention can be used for the fabrication of a variety of display devices, including cathodoluminescent displays, liquid crystal displays, electroluminescence displays, field emission displays and vacuum fluorescent displays. In addition, the fluorescent film can be used as a display material for exterior decoration of electronic appliances, e.g., keypads of cellular phones. Display devices comprising the fluorescent film exhibit improved luminescent properties and uniform physical properties.

Hereinafter, the invention will be explained in more detail with reference to the following examples. However, these examples are given for the purpose of illustration and are not to be construed as limiting the scope of the invention.

EXAMPLES

Synthesis Example 1

The dispersant represented by the following Formula 5 can be synthesized by the following reaction scheme 1:

i) Formation of Random Copolymer as Backbone

Methyl dimethylketene methyltrimethylsilyl acetal (1.74 grams (g), 10 mmol) as an initiator, tetrabutylammoniumchlorobenzoate (0.4 g, 0.1 mmol) as a catalyst and acetonitrile (3 ml) were placed in a round-bottom flask under an argon atmosphere at room temperature, and stirred using a magnetic bar for two hours. To the reaction solution was slowly added a solution of benzyl methacrylate (BMA, 6.16 g, 0.035 mmol), trimethylsilyl methacrylate (TMSMA, 2.37 g, 0.015 mol) and glycidyl methacrylate (GMA, 0.71 g, 0.005 mol) as monomers in tetrahydrofuran (THF, 10 ml). After stirring for 4 hours, the copolymerization was completed to yield a random copolymer compound 1 as a backbone having (BMA: TMSMA:GMA=7:3:1 (w/w/w), with an estimated molecular weight of 2,500 grams/mole).

ii) Introduction Carboxyl Group into trimethylsilyl methacrylate

To substitute the silyl group of trimethylsilyl methacrylate in the backbone 1 with a carboxyl group, to the TFT solution was added methanol and refluxed for 6 hours. The solvent was removed under a reduced pressure. The residue was dried in a vacuum oven for 24 hours to yield a compound 2 in the form of solid powder, where a carboxyl group is introduced into the trimethylsilyl methacrylate.

iii) Introduction Amine Group into glycidyl methacrylate

To substitute the glycidyl group of glycidyl methacrylate in the backbone 2 with an amine group, the compound 2 (2 g) was dissolved in glyme (0.5 mL). To the solution was added diethyl amine and stirred with silica gel under a nitrogen atmosphere at room temperature for 3 hours. The reaction mixture was precipitated in ethyl ether. The precipitate was filtered to remove the silica gel. The residue was dried in a vacuum oven for 24 hours to yield a compound 3 (a dispersant represented by Formula 5 below) as a solid powder.

Figure 1:
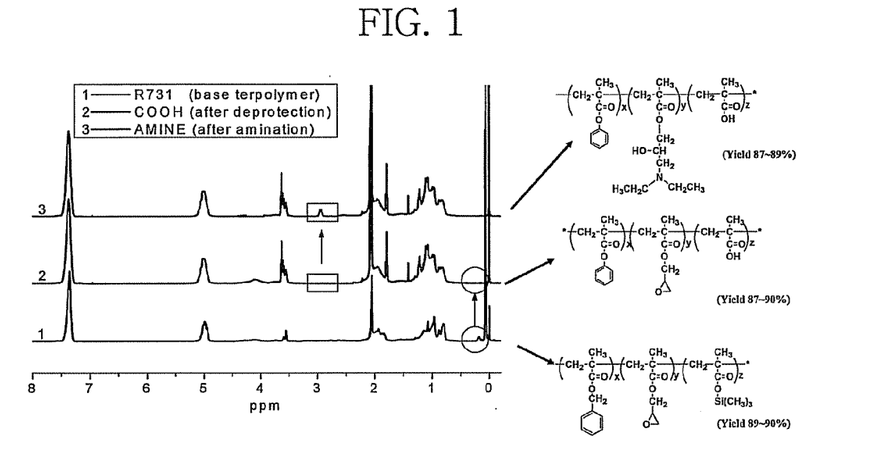
FIG. 1 is a $^1$H-NMR spectrum of a dispersant synthesized in Synthesis Example 1 according to one embodiment.

The $^1$H-NMR spectrum of the dispersant of Formula 5 thus synthesized was shown in FIG. 1.

Synthesis Example 2

The dispersant represented by the following Formula 6 can be synthesized by the following reaction scheme 2:

Reaction Scheme 2

-continued

(5)

i) Formation of Random Copolymer as Backbone

Methyl dimethylketene methyltrimethylsilyl acetal (1.74 g, 10 mmol) as an initiator, tetrabutylammonium-chlorobenzoate (0.4 g, 0.1 mmol) as a catalyst and acetonitrile (3 ml) were placed in a round-bottom flask under an argon atmosphere at room temperature, and stirred using a magnetic bar for two hours. To the reaction solution was slowly added a solution of benzyl methacrylate (BMA, 6.16 g, 0.035 mmol), trimethylsilyl methacrylate (TMSMA, 2.37 g, 0.015 mol) and (diethylamino)ethyl methacrylate (DEAEMA, 0.92 g, 0.005 mol) as monomers in tetrahydrofuran (THF, 10 ml). After stirring for 4 hours, the copolymerization was completed to yield a random copolymer compound 4 as a backbone having (BMA:TMSMA:DEAEMA=7:3:1 (w/w/w), and an estimated molecular weight of 2,500 g/mole).

ii) Introduction Carboxyl Group into trimethylsilyl methacrylate

To substitute the silyl group of trimethylsilyl methacrylate in the backbone 4 with a carboxyl group, to the TFT solution was added methanol and refluxed for 6 hours. The solvent was removed under a reduced pressure. The residue was dried in a vacuum oven for 24 hours to yield a compound 5 (a dispersant represented by Formula 6 below) as a solid powder.

(6)

Figure 2:
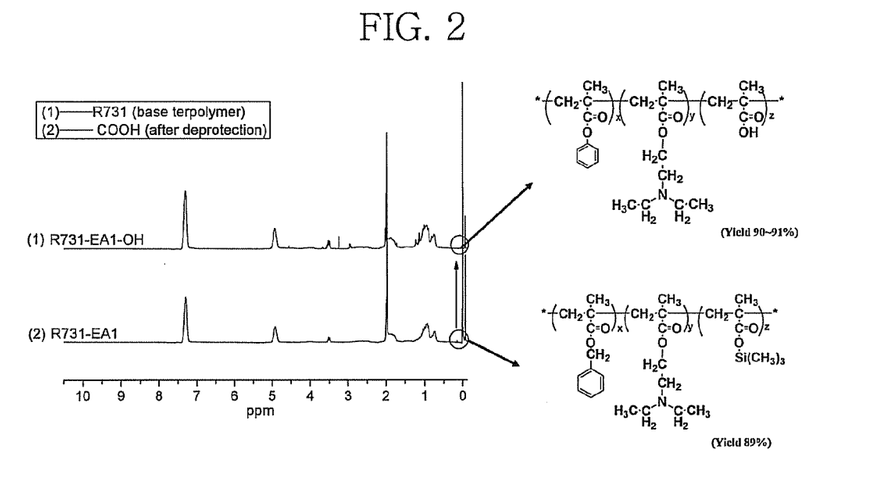
FIG. 2 is a $^1$H-NMR spectrum of a dispersant synthesized in Synthesis Example 2 according to another embodiment.

The $^1$H-NMR spectrum of the dispersant of Formula 6 thus synthesized was shown in FIG. 2.

Example 1

A commercially available organic red phosphor powder (PKS__225, UkSeung Chemical Co., Ltd., Korea) was used as a phosphor. Polyester was used as an organic binder. 45% polyester binder in cyclohexanone (TEIKOKU INS INK 000 series) was used as a binder solution. To the binder solution was added the phosphor powder (2 g) and a solution (0.333 g) of a 30% dispersant in cyclohexanone. The dispersant was prepared in accordance with the Synthesis Examples while the ratio of an aromatic, acidic and basic group was adjusted to 9:1:1. The mixture was milled to prepare a phosphor paste composition.

The phosphor paste composition was coated onto a polyethylene terephthalate (PET) transparent film using a doctor blade. The coating was dried on a hot plate at 100° C. for 10 min to produce a fluorescent film with a thickness of 35 μm.

Example 2

A fluorescent film was produced in the same manner as in Example 1, except that a dispersant, where the ratio of an aromatic, acidic and basic group is 7:3:1, was used.

Example 3

A fluorescent film was produced in the same manner as in Example 1, except that a dispersant, where the ratio of an aromatic, acidic and basic group is 5:5:1, was used.

Example 4

A fluorescent film was produced in the same manner as in Example 1, except that a dispersant, where the ratio of an aromatic, acidic and basic group is 7:3:3, was used.

Example 5

A fluorescent film was produced in the same manner as in Example 1, except that a dispersant where the ratio of an aromatic, acidic and basic group is 7:3:1 was used, and the basic group was bonded to a block type copolymer. The block type copolymer was synthesized under the same reaction conditions in accordance with the same functionalization method as a random type copolymer, except that the addition of monomers was performed not simultaneously but separately.

Each type of the dispersant used in Examples 1 to 5 is summarized in the Table 1 below:

TABLE 1

| | Ratio (Aromatic:Acidic:Basic group, w/w/w) | | | Binding type of basic group |
|---|---|---|---|---|
| | Aromatic group | Acidic group | Basic group | |
| Ex. 1 | 9 | 1 | 1 | Random |
| Ex. 2 | 7 | 3 | 1 | |
| Ex. 3 | 5 | 5 | 1 | |
| Ex. 4 | 7 | 3 | 3 | |
| Ex. 5 | 7 | 3 | 1 | Block |

Examples 6-10

Fluorescent films were respectively produced in the same manner as in Examples 1 to 5, except that a solution (molecular weight: 30,000) of 37% polyacrylate in PGMEA (propylene glycol methyl ether acetate) was used as an organic binder solution, and the thickness of the fluorescent films was 30 μm.

Example 11

A fluorescent film was produced in the same manner as in Example 1, except that polyester acrylate (EB657, acid value: 20 mg KOH/g, base value: 25 mg KOH/g, molecular weight: 1,500, SK CYTEC. Co., Ltd., Korea) was used as a dispersant.

Example 12

A fluorescent film was produced in the same manner as in Example 6, except that polyester acrylate (EB657, acid value: 20 mg KOH/g, base value: 25 mg KOH/g, molecular weight 1,500 grams per mole, SK CYTEC. Co., Ltd., Korea) was used as a dispersant.

Comparative Example 1

A fluorescent film was produced in the same manner as in Example 1, except that no dispersant was used.

Comparative Example 2

A fluorescent film was produced in the same manner as in Example 1, except that dispersant BYK170 containing only acidic group (BYK chemie, acid value: 11 mgKOH/g) was used as a dispersant.

Comparative Example 3

A fluorescent film was produced in the same manner as in Example 1, except that dispersant BYK161 containing only basic groups (BYK chemie, amine value: 11 mgKOH/g) was used as a dispersant.

Comparative Examples 4-6

Fluorescent films were respectively produced in the same manner as in Comparative Examples 1 to 3, except that a solution (molecular weight 30,000 grams/mole) of 37% polyacrylate in PAMEA was used as an organic binder solution, and the thickness of the fluorescent films was 30 μm.

Experimental Example

Evaluation of the Luminescent Properties of Fluorescent Films

To evaluate the luminescent properties of the florescent films produced in Examples 1 to 12 and Comparative Examples 1 to 6, the luminescence intensity of each florescent film was measured on a UV luminescent device at a wavelength of 400 nm. At this time, the luminescence intensity was measured using an Ocean Optics USB 100 detector.

The results are shown in FIGS. 3a and 3b, and FIGS. 4a and 4b.

Figure 3A:
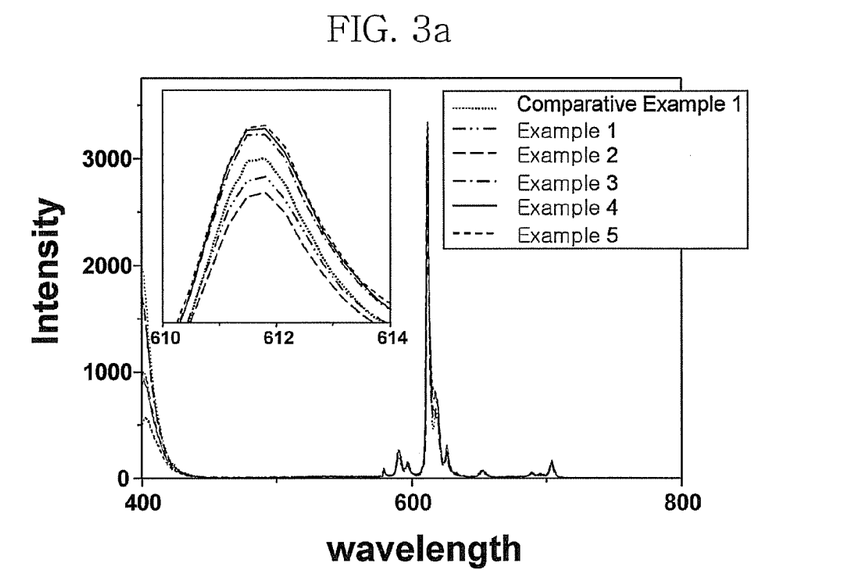
FIG. 3a is a graph showing a comparison in the luminescent properties of fluorescent films produced from phosphor paste compositions prepared by mixing a polyester binder with a dispersant according to one embodiment of the present invention.
Figure 3B:
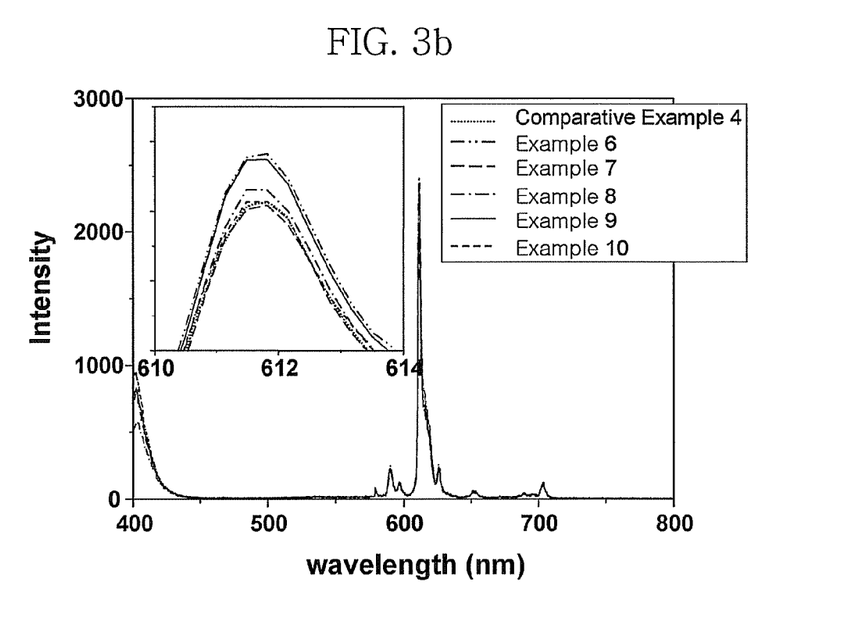
FIG. 3b is a graph showing a comparison in the luminescent properties of fluorescent films produced from phosphor paste compositions prepared by mixing a polyacrylate binder with a dispersant according to one embodiment.
Figure 4A:
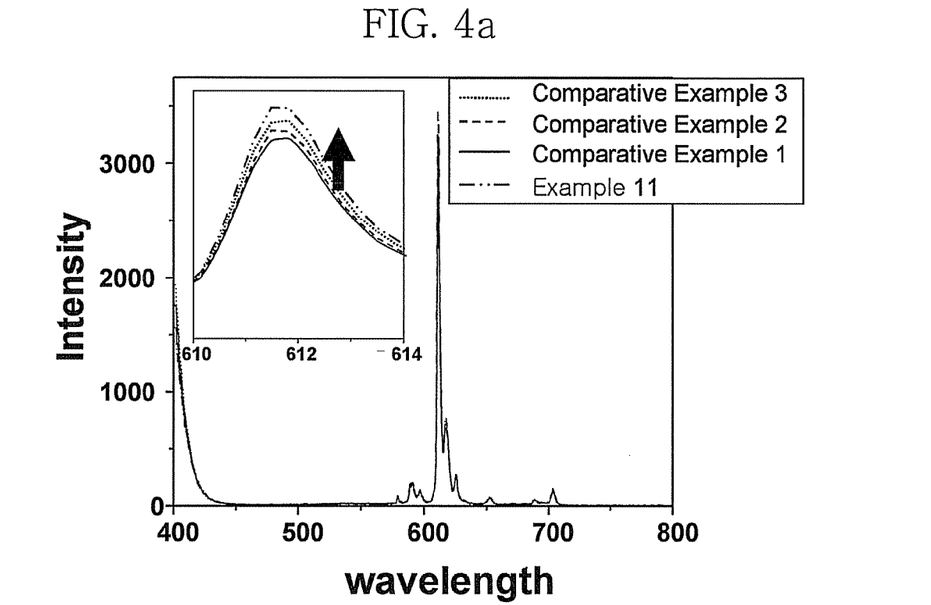
FIG. 4a is a graph showing a comparison in the luminescent properties of fluorescent films produced from phosphor paste compositions prepared by mixing a polyester binder with a dispersant according to one embodiment.
Figure 4B:
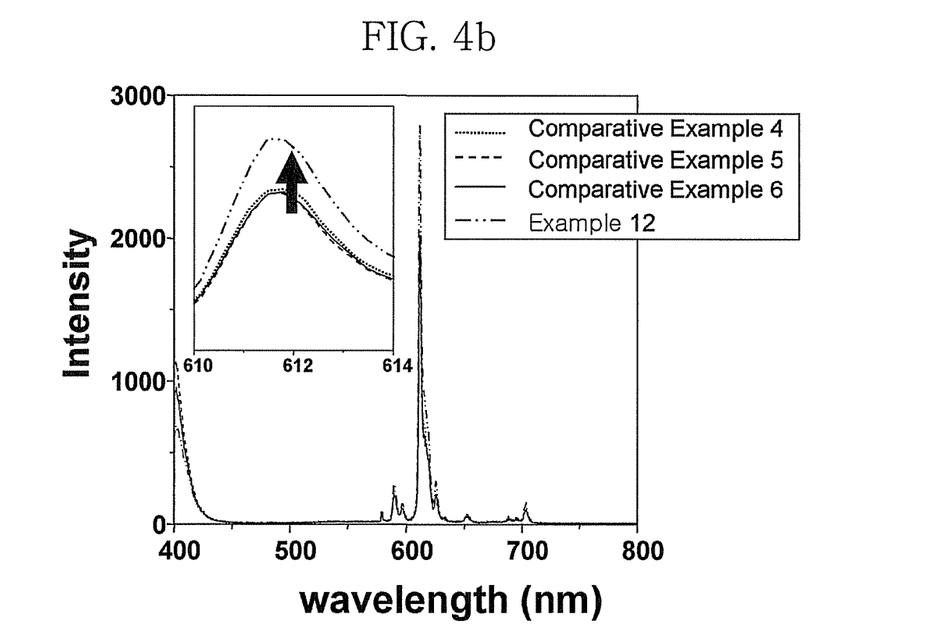
FIG. 4b is a graph showing a comparison in the luminescent properties of fluorescent films produced from phosphor paste com- positions prepared by mixing a polyacrylate binder with a dispersant according to one embodiment.

As shown in FIGS. 3a and 3b, and FIGS. 4a and 4b, when compared under the same conditions of thickness and wavelength (i.e., 400 nm), the luminescence intensity of the florescent films (Examples 1 to 12) produced using dispersants having a multifunctional head structure was increased, respectively, when compared with the florescent films (Comparative Examples 1 to 6) produced using conventional dispersants or without using any dispersant. The graphs shown in FIGS. 4a and 4b demonstrate, when compared using the same binder, that the luminescence intensity of the florescent films produced using the dispersant comprising both acidic and basic groups was increased, as compared to that of the florescent films produced using the dispersant containing either acidic or basic groups. As shown in FIGS. 3a and 3b, when the florescent films comprise a polyester-based binder, the dispersants, where aromatic, acidic and basic groups are respectively used in a ratio of are respectively 7:3:1, 7:3:3, and 5:5:1, are effective in exhibiting high luminescence intensity. When the florescent films comprise a polyacrylate-based binder, the dispersants, where aromatic, acidic and basic groups are respectively used in a ratio of 9:1:1, 7:3:3, and 5:5:1, are effective in exhibiting high luminescence intensity. These results show that the phosphor paste compositions comprising the dispersants of the present invention exhibit improved luminescence intensity as compared to conventional phosphor paste compositions.

Although the preferred embodiments of the present invention have been disclosed for illustrative purposes, those skilled in the art will appreciate that various modifications and variations are possible, without departing from the scope and spirit of the invention as disclosed in the appended claims. Accordingly, such modifications and variations are intended to come within the scope of the appended claims.

As apparent from the above description, the novel dispersant has advantages that it can improve the dispersibility of a phosphor paste composition when it is used to prepare the phosphor paste composition, and be applied to a variety of phosphors.

Since the phosphor paste composition comprising the dispersant improves dispersibility and limits an increase in viscosity, it permits the use of a larger amount of a phosphor, thus enabling the formation of uniform fluorescent films having improved luminescent properties. Display devices, such as LCDs, having high luminance and excellent processability can be fabricated.

What is claimed is:

1. A phosphor paste composition comprising:
   a dispersant represented by Formula 1 or 2 below;
   a binder solution of an organic binder in a solvent; and
   a phosphor

(1)

wherein A is an aromatic group, B is an acidic group and C is a basic group, a, b and c are independently an integer from 0 to about 10 with the proviso that two or more of a, b and c are not simultaneously zero, n is an integer of about 1 to about 15, and

D is hydrogen, alkyl, polyester or polyether;

(2)

wherein A is an aromatic group, B is an acidic group and C is a basic group, a, b and c are independently an integer from 0 to about 10 with the proviso that two or more of a, b and c are not simultaneously zero, and n is an integer of about 1 to about 15.

2. The phosphor paste composition according to claim 1, wherein the dispersant of Formula 1 is represented by Formula 3 below:

(3)

wherein a, b and c are independently an integer from 0 to about 10 with the proviso that two or more of a, b and c are not simultaneously zero, and n is an integer of about 1 to about 15.

3. The phosphor paste composition according to claim 1, wherein the dispersant of Formula 2 is represented by Formula 4 below:

(4)

wherein a, b and c are independently an integer from 0 to about 10 with the proviso that two or more of a, b and c are not simultaneously zero, and n is an integer of about 1 to about 15.

4. The phosphor paste composition according to claim 1, wherein the phosphor paste composition comprises about 30 to about 70% by weight of the phosphor, about 0.1 to about 10% by weight of the dispersant with respect to the phosphor powder, and the balance of the binder solution.

5. The phosphor paste composition according to claim 1, wherein the binder solution comprises about 1.5 to about 5% by weight of the organic binder and the remainder of a mixed solvent.

6. The phosphor paste composition according to claim 1, wherein the organic binder is selected from the group consisting of acrylic polymers, styrenic polymers, cellulosic polymers, methacrylate ester polymers, styrene-acrylate ester copolymers, polyvinylbutyral, polyvinyl alcohol, polyethylene oxide, polypropylene carbonate, polymethylmethacrylate, polyester and a combination comprising at least one of the foregoing polymers.

7. The phosphor paste composition according to claim 1, wherein the solvent is selected from the group consisting of aromatic hydrocarbon compounds including toluene and xylene; ether compounds, including tetrahydrofuran and 1,2-butoxyethane; ketone compounds, including acetone, methyl ethyl ketone and cyclohexanone; ester compounds, including ethyl acetate, butyl acetate and butyl carbitol acetate (BCA); alcohol compounds, including isopropyl alcohol, diethylene glycol monobutyl ether, terpineol and 2-phenoxyethanol, and a combination comprising at least one of the foregoing solvents.

8. The phosphor paste composition according to claim 1, wherein the phosphor is an oxide phosphor, a sulfide phosphor, or an organic phosphor.

* * * * *